(12) United States Patent
Ream et al.

(10) Patent No.: US 6,570,598 B1
(45) Date of Patent: May 27, 2003

(54) SUB-PEL REGISTRATION OF COLOR PLANES USING CARTRIDGE VELOCITY CONTROL

(75) Inventors: Gregory Lawrence Ream, Lexington, KY (US); David Anthony Schneider, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/121,199

(22) Filed: Apr. 12, 2002

(51) Int. Cl.[7] .............................. G03G 15/01; B41J 2/44
(52) U.S. Cl. .................... 347/116; 399/167; 399/301
(58) Field of Search ................................. 347/116, 232, 347/234; 399/167, 299, 301

(56) References Cited

U.S. PATENT DOCUMENTS 6,278,857 B1 * 8/2001 Monji et al. ............... 399/301
6,408,157 B1 * 6/2002 Tanaka et al. ............. 399/301

* cited by examiner

Primary Examiner—Joan Pendegrass
(74) Attorney, Agent, or Firm—Taylor & Aust, P.C.; John A. Brady (57) ABSTRACT

An electrophotographic image forming apparatus has defined therein a longitudinal or process direction, and includes plural photoconductive drums, each having an image forming surface. Multiple printhead units are provided for generating image information bearing laser beams. Each printhead unit includes optics for scanning the laser beam to form a plurality of scan lines extending across the corresponding photoconductive drum in a transverse scan direction which traverses the process direction. Registration of a scan line from one printhead with a corresponding scan line from another printhead in the process direction is achieved by adjusting the time required to translate one of the scan lines from a location where it is electrostatically formed to a location where it is transferred to an image receiving medium. Adjustment of the translation time may be achieved by modifying the rotational speed of the associated drum. Printhead optics may include rotatable polygonal prisms having plane reflective surfaces which are started in a random phase relationship. Control of the drum rotational speeds is also effective to achieve a predetermined apparent scanning phase relationship among the prisms.

24 Claims, 8 Drawing Sheets

| | 0 | -1 | -2 | -3 | cPhase -4 | -5 | -6 | -7 |
|---|---|---|---|---|---|---|---|---|
| Count | 9382 | 9381 | 9380 | 9379 | 9378 | 9377 | 9376 | 9375 |
| PC Velocity | 108.97 | 108.98 | 109.00 | 109.01 | 109.02 | 109.03 | 109.04 | 109.05 |
| Time Y-Image to Y-xfer | 0.406709 | 0.406665 | 0.406622 | 0.406578 | 0.406535 | 0.406482 | 0.406448 | 0.406405 |
| Time Y-Image to K-xfer | 3.159577 | 3.159534 | 3.159491 | 3.159447 | 3.159404 | 3.159360 | 3.159317 | 3.159274 |
| Arrival Time as Ref to 0 | 0 | 0.000043 | 0.000087 | 0.000130 | 0.000173 | 0.000217 | 0.000260 | 0.000303 |
| Partial Pel Arrival | 0 | 1 | 2 | 3 | 4 | 5 | 6 | 7 |

| | 0 | 1 | 2 | 3 | cPhase 4 | 5 | 6 | 7 |
|---|---|---|---|---|---|---|---|---|
| Count | 9382 | 9383 | 9384 | 9385 | 9386 | 9387 | 9388 | 9389 |
| PC Velocity | 108.97 | 108.96 | 108.95 | 108.94 | 108.93 | 108.91 | 108.90 | 108.89 |
| Time Y-Image to Y-xfer | 0.406709 | 0.406752 | 0.406795 | 0.406839 | 0.406852 | 0.406925 | 0.406969 | 0.407012 |
| Time Y-Image to K-xfer | 3.159577 | 3.159621 | 3.159664 | 3.159707 | 3.159751 | 3.159794 | 3.159837 | 3.159881 |
| Arrival Time as Ref to 0 | 0 | -0.000043 | -0.000087 | -0.000130 | -0.000173 | -0.000217 | -0.000260 | -0.000303 |
| Partial Pel Arrival | 0 | -1 | -2 | -3 | -4 | -5 | -6 | -7 |

Fig. 12

SUB-PEL REGISTRATION OF COLOR PLANES USING CARTRIDGE VELOCITY CONTROL

BACKGROUND OF THE INVENTION

1. Field of the Invention

The present invention relates to an electrophotographic machine and more particularly to a method and apparatus for achieving registration of multiple color images in the process direction.

2. Description of the Related Art

An in-line color laser image printing process where the media passes through four color developing stations in series will print the same speed as monochrome. The photo conductive drum exposures must occur for all four colors at the proper time. Both process and scan direction alignment of the four color developing stations is critical. The process location of each scanning laser beam must overlap to prevent color offset in the process direction. If one beam is out of synchronization with the others, the image in the corresponding color will be misaligned relative to the remaining color components, and the resulting image blurred. Each color should have an adjustment to correct for process direction misalignment because each color has a scanning laser beam following a separate optical path. Thermal changes will cause misalignment so the adjustment should be performed regularly and not be just a one time manufacturing adjustment.

One technique for compensating for process direction errors involves the synthesis of a dot or PEL by controlling the power of the laser beam during the scanning of an adjacent pair of scan lines to form a synthesized dot which lies at a synthesized position between the adjacent pair of scan lines as disclosed in Hadady et al U.S. Pat. No. 6,229,555 assigned to the assignee of the present invention. In color printers, analog techniques for controlling the rotational phase of the polygonal mirrors, and the phase and period of rotational driving of the toner image carriers for each of several different monochrome color units to achieve synchronization among the units have been suggested. One system suggests a fine synchronizing control unit to control the rotational phase of the polygon mirrors by utilizing the outputs of three selectors which are input to the polygon mirror's driving motors of the each of three monochromatic toner image forming units and the selection of the three selectors is varied in accordance with a position-shift correction quantity.

There remains a need for a simplistic yet effective technique for achieving good quality PEL registration among multiple printheads in the process direction.

SUMMARY OF THE INVENTION

The present invention provides process direction registration among several printheads by altering image translation time within the individual printheads.

The invention comprises, in one form thereof, coordinating the operation of a plurality of laser printheads which cooperate in the creation of an image by repetitive or periodic laser beam transverse scans to form images at respective first locations, translate the formed images to respective second locations, and transfer the translated images to a common image receiving medium, by starting the scanning of first and second printheads in a random phase relationship to one another and subsequently locking the scanning phase relationship between the first and second printheads. The locked scanning phase relationship is determined and the translation time of the image formed by the second printhead is altered by an amount determined, in part, by the determined phase relationship to achieve a predetermined apparent scanning phase relationship between the first and second printheads. Additional printheads may be similarly phased with the first printhead.

Also in general, and in one form of the invention, coordination of the operation of a plurality of laser printheads which cooperate in the creation of an image by periodic laser beam transverse scans to form images at respective first locations, translate the formed images to respective second locations, and transfer the translated images to a common image receiving medium is achieved by determining the longitudinal position of the transverse scan of each laser beam and then altering the translation time of the image formed by at least one printhead by an amount determined, in part, by a corresponding determined longitudinal position to achieve sub-pel registration. Alteration of the translation time of the image formed by additional ones of the printheads by amounts determined, in part, by the determined longitudinal position of the transverse scan of corresponding laser beams may occur.

An advantage of the present invention is that the coordination of images formed by several laser beams in a color printing environment is achieved.

Another advantage of the present invention is that the need for adjusting individual rotating polygonal mirrors to achieve proper phasing upon start-up is eliminated.

A further advantage of the present invention is that the same technique may be utilized to achieve proper phasing among multiple rotating mirrors and to correct for process direction laser beam variations.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
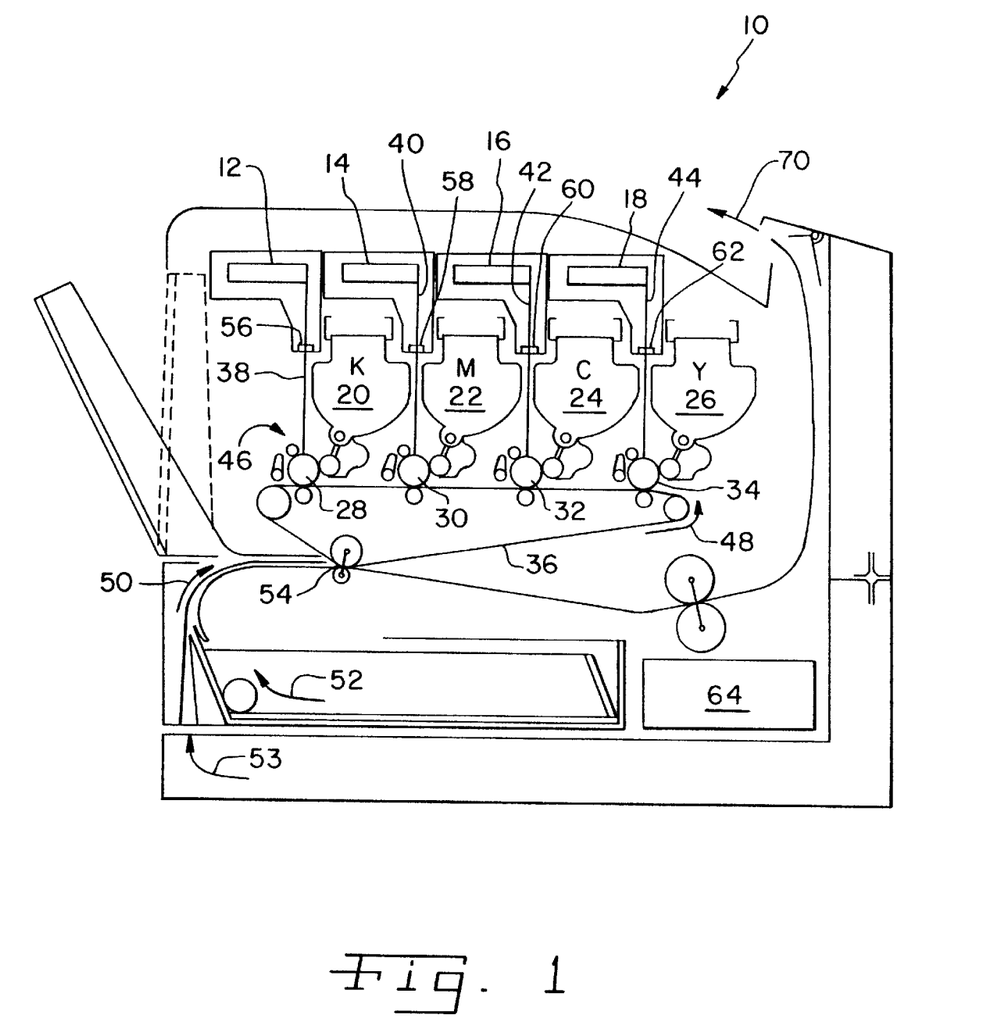
FIG. 1 is a side elevation view showing certain components of a multicolor laser printer.

Referring now to the drawings and particularly to FIG. 1, there is shown an embodiment of a laser printer 10 having, for example, four laser printheads such as 12, 14, 16 and 18 aligned along an intermediate transfer member in the form of image transfer belt 36. Each of the printheads 12, 14, 16, and 18 develops an image on a corresponding photo conductive drum 28, 30, 32 or 34. Next, the image is developed with one of four-color toners supplied from a black toner cartridge 20, a magenta toner cartridge 22, a cyan toner cartridge 24, a yellow toner cartridge 26, and transferred successively onto the image transfer belt 36. Finally, the image is transferred to a substrate (paper or transparency) at nip 54, fused and processed out of the printer as indicated by the arrow 70. Each laser printhead executes a scan pattern of repeated transverse scans along the corresponding photo conductive drum as that drum rotates.

Each of laser printhead units 12, 14, 16 and 18 include optical components, such as lenses and a rotatable multi-faceted mirror, which focus and scan a respective laser beam 38, 40, 42, 44 in a scan direction, perpendicular to the plane of FIG. 1, across a respective one of photoconductive drums 28, 30, 32 and 34. Each of photoconductive drums 28, 30, 32 and 34 is negatively charged and is subsequently partially discharged in the areas of its peripheral surface that are impinged by a respective one of laser beams 38, 40, 42 and 44 to form a latent electrostatic image thereon made up of a plurality of dots, or spots.

During each scan of a laser beam across a photoconductive drum, each of photoconductive drums 28, 30, 32 and 34 is continuously rotated, clockwise as viewed in FIG. 1, in a process direction indicated by direction arrow 46. The scanning of laser beams 38, 40, 42 and 44 across the peripheral surfaces of the photoconductive drums is cyclically repeated thereby discharging the areas of the peripheral surfaces on which the laser beams impinge.

Figure 4:
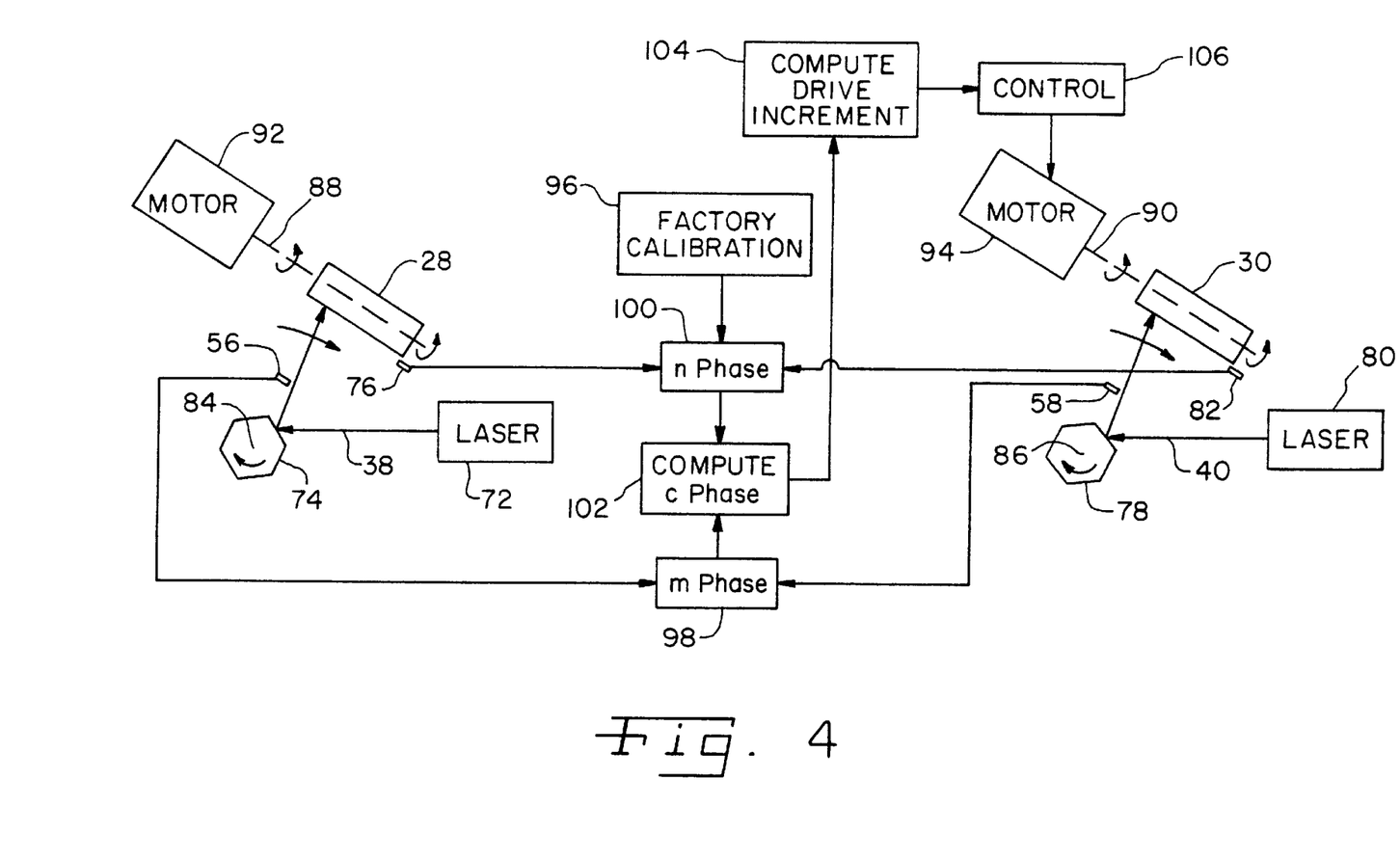
FIG. 4 is a simplified plan view of the image forming portion of two illustrative print heads with circuitry coordinating their operation schematically illustrated.
Figure 5:
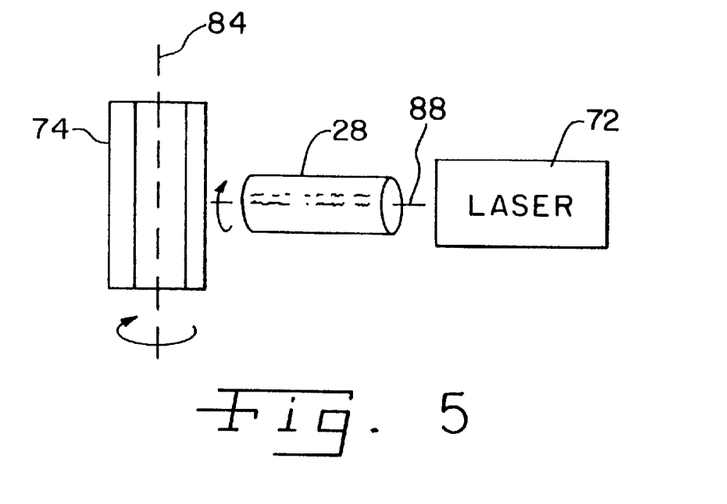
FIGS. 5 and 6 are side elevation views of the image forming portions of FIG. 4.
Figure 6:
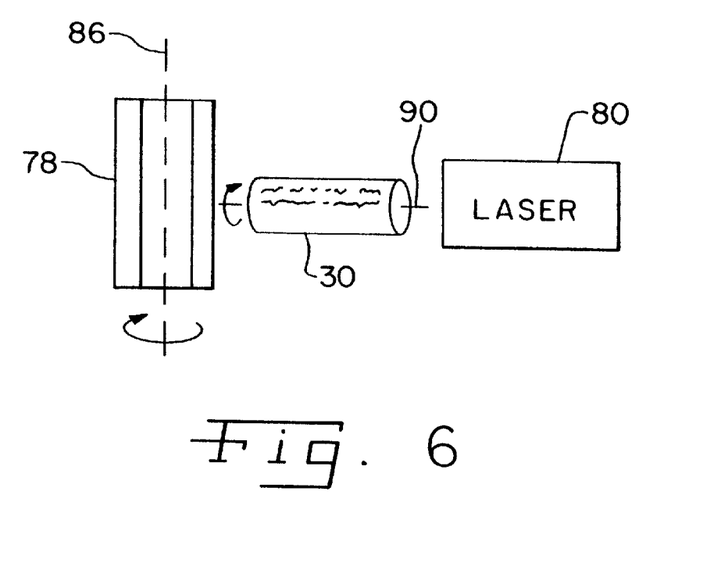

This is illustrated in greater detail for a pair of printheads 12 and 14 in FIGS. 4–6. The plane of FIGS. 5 and 6 is orthogonal to that of FIG. 4. A beam 38 from laser 72 impinges a rotating multi-faceted mirror such as prism 74 which has a regular polygonal cross-sectional configuration and reflective plane surfaces. The laser beam sweeps in a repeated transverse scan path as polygonal prism mirror structure 74 rotates. Laser beam 38 progresses along the transverse path and is incident start of scan sensor 56 After scanning past the sensor 56, the beam exits the printhead, impinges a photo conductive drum 28 and performs an image forming task. Finally, the laser beam passes a beam position sensor 76, and shortly thereafter, a new scan line reflected from an adjacent prism face commences. Similarly, the polygonal mirror structure 78 rotates causing beam 40 from laser 80 to repeatedly scan past start of scan sensor 58, rotating photoconductive drum 30 and beam position sensor 82. The polygonal mirror rotational speeds may, for example, be synchronized or locked together by deriving their respective drive signals from a common clock source. The beam position sensors may, for example, be of a type having two elongated sensor elements extending obliquely to one another. The time between the laser beam impinging the first and second elements provides a measure of beam position in the process direction. The other lasers repeatedly scan in substantially the same way.

The toner in each of toner cartridges 20, 22, 24 and 26 is negatively charged and is conveyed by an electrically conductive roller. During the printing operation, the conveyance roller is biased to a negative voltage intermediate the original negative charge and the partially discharged value. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been partially discharged by the laser beams. As belt 36 rotates in the direction indicated by arrow 48, the toner from each of drums 28, 30, 32 and 34 is transferred to the outside surface of belt 36. As a print medium, such as paper, travels along path 50 as fed from a paper tray at 52 or from duplexing path 53, the toner is transferred to the surface of the print medium in nip 54.

Figure 2:
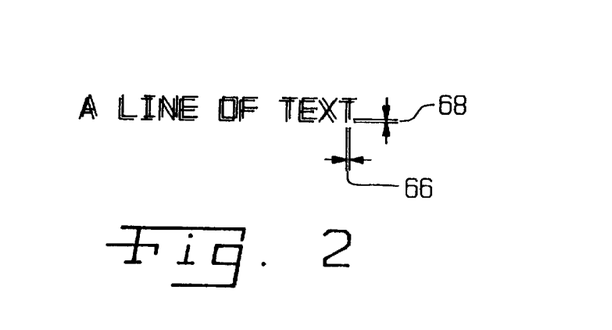
FIG. 2 shows a line of text printed by two print heads lacking correct registration.

Each of printhead units 12, 14, 16 and 18 is electrically coupled to and controlled by a printhead controller 64. Printhead controller 64 includes microprocessor and data signal processing modules, such as a raster image processor (RIP), for processing print data received from a source computer (not shown). In addition, printhead controller 64 includes modules for processing sensor information received from each of the start of scan (SOS) sensors 56, 58, 60 and 62 for detecting the beginning of each laser scan line. Synchronization among the four printheads is critical for achieving a crisp printed product. Slight errors in printhead timing may result in a blurred image as shown in FIG. 2. For example, when printing a dot or print element (PEL) of a color which requires the blending of two or more of the printhead toners, a slight lack of proper registration among the printhead contributions results in a PEL which resembles a Venn diagram having the intersection properly blended, but also having lobes formed primarily of the individual toner colors.

In FIG. 2, the line of text printed by two printheads is illustrated as being slightly misaligned in the scan direction as indicated by the dimension 66 and in the process direction by dimension 68. Scan errors such as 66 can be controlled by sensing for the start of scan (SOS) for each printhead and controlling the laser beams accordingly as is known in the art. Process direction errors such as 68 are somewhat harder to control.

Figure 8:
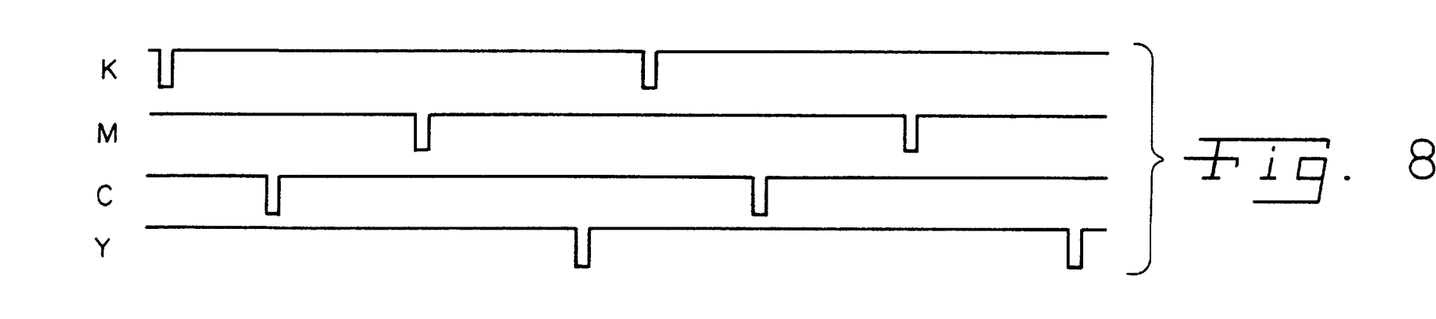
FIG. 8 is a timing diagram illustrating a possible random phase relationship among printheads at start-up.
Figure 9:
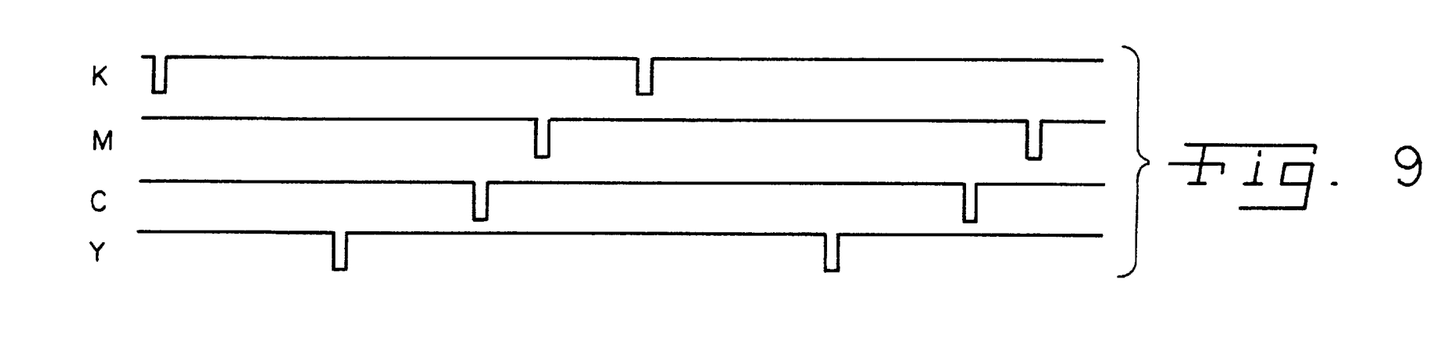
FIG. 9 is a timing diagram showing printhead phase relationship after calibration.
Figure 10:
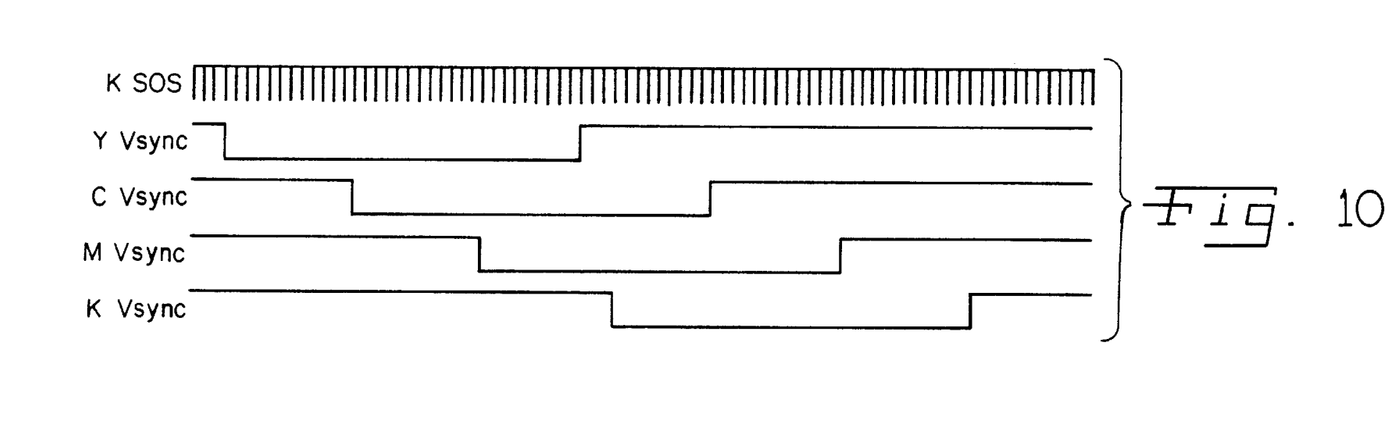
FIG. 10 is a timing diagram showing the relationship among the Vsync signals for the phase relationship of FIG. 9.
Figure 11:
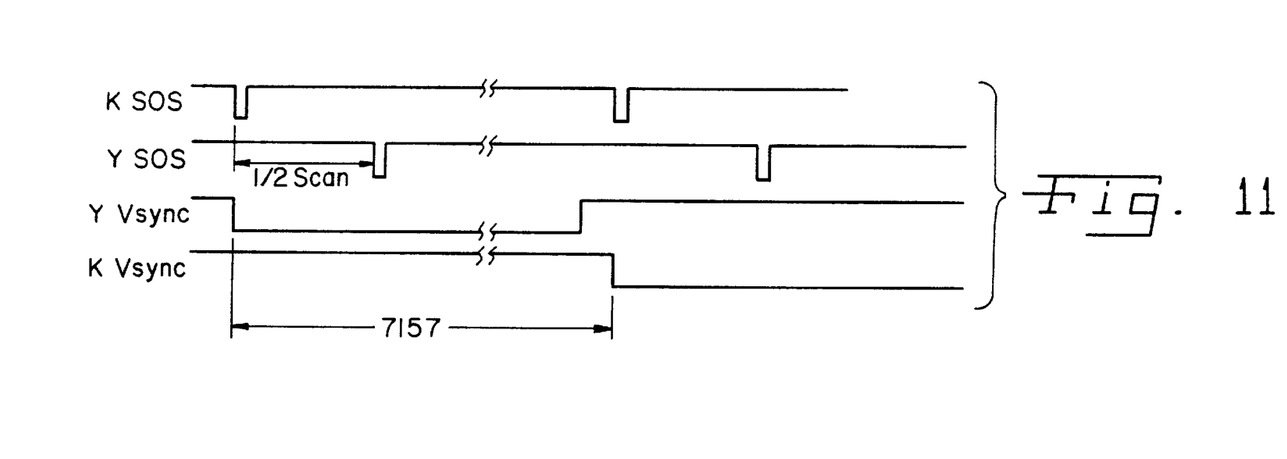
FIG. 11 is a timing diagram showing the relationship between start of scan and Vsync signals for two illustrative printheads.

One technique to achieve sub-pel registration in the process direction employs phasing the four laser printheads. The nominal spacing between the print stations is 101 mm or approximately 2385.83 scan lines from K (printhead 12) to M (printhead 14) and 303 mm or 7157.48 scan lines from K (printhead 12) to Y (printhead 18). After receiving a vertical synchronization signal (Vsync) for a particular station, the raster image processor (RIP) starts to direct memory access the data on the next start of scan (SOS) for that color. All four Vsyncs are synchronized to the K SOS. The phase relationship of the SOS signals controls the sub-pel registration. For example the nominal time between when the Y image starts and the K image starts is 7157 scans plus the time from when the K SOS is detected and the Y SOS is detected. FIGS. 8–11 illustrate this sequence. FIG. 8 is a timing diagram illustrating one of many possible random phase relationships among printheads at start-up while FIG. 9 is a similar timing diagram showing printhead phase relationship after proper sequencing has been established. In FIG. 10 the relationship among the Vsync signals for the phase relationship of FIG. 9 is illustrated. FIG. 11 is a timing diagram showing the relationship between start of scan and Vsync signals for two illustrative printheads 12 and 18.

Figure 3:
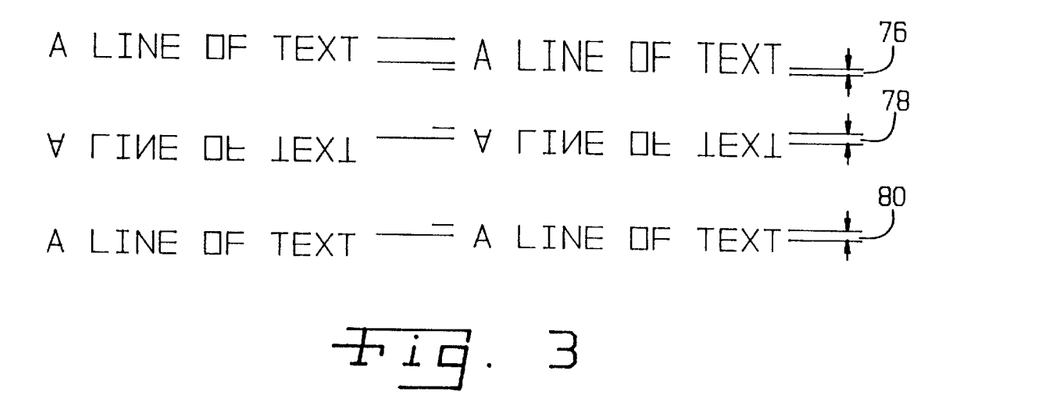
FIG. 3 compares a line of text for two printheads at several stages in a printing process of correcting for incorrect registration in the process direction.

Process direction misalignment such as 68 in FIG. 2 may be corrected by imposing dissimilar image transfer rates on the two involved printheads between the locations at which the images are formed on the photoconductive drums and the locations at which the images are transferred to an image receiving medium such as the image transfer belt 36. Assume the upper image in FIG. 2 has been printed by printhead 12 and the lower image by printhead 14. The lefthand column of FIG. 3 shows the line of text as it is written to or imposed on the drum 28, as it appears inverted when transferred to the image transfer belt 36, and finally as it appears on the paper or other image receiving medium. If drum 30 has its angular velocity increased, the image written to it will appear elongated as shown by the top entry of the righthand column. The aspect ratio (height to width) is changed by an increase in drum speed and the line of text is stretched as though it had been printed on a rubber sheet and then the sheet stretched in the process direction, but since the image is formed and the media moved at the same fixed rate, this distortion does not appear in the final image. Of course, slowing the drum angular velocity results in the line of text which is compressed in the process direction. Because drum 30 is moving more rapidly, the angular velocity increase causes the image to arrive at the location for transfer to the image transfer belt 36 sooner and the image appears on the belt somewhat raised as indicated by dimension 78. The image as subsequently transferred to the paper will also be raised as indicated at 80 to correct for the misalignment 68 of FIG. 2. The stretching and shifting of text as shown in FIG. 3 is somewhat exaggerated as compared to FIG. 2. The dissimilar image transfer rates may be achieved as illustrated in FIGS. 4–6.

Figure 7:
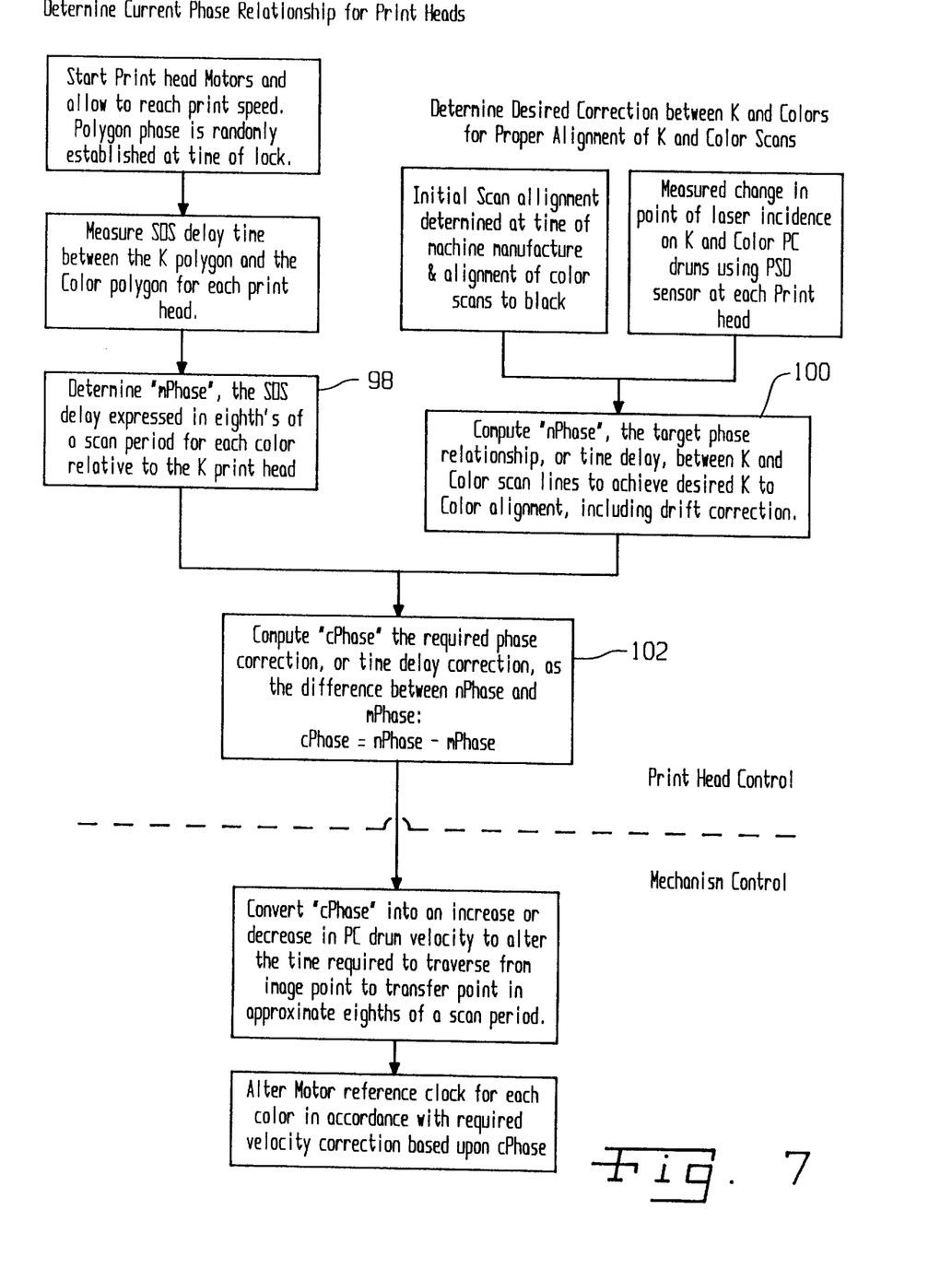
FIG. 7 is a schematic illustration of the process for achieving improved registration according to the present invention.

The image forming apparatus is shown in FIGS. 4–6 as having two laser printheads, but printheads 16 and 18 may also be synchronized to printhead 12 and in the same way. Each printhead has a cylindrical photoconductive drum 28 or 30, a drum drive motor 92 or 94 for rotating the drum about a corresponding cylinder axis 88 or 90. Each has a laser 72 or 80 for providing an image information modulated laser beam 38 or 40 and a rotatable mirror such as polygonal prism 74 or 78 for repeatedly directing the laser beam to scan the photoconductive drum in a transverse direction. The prisms 74 and 78 rotate about respective prism axes 84 and 86. Each printhead has a start of scan sensor 56 or 58 for determining when the laser beam commences a drum scan and a beam position sensor 76 or 82 for determining longitudinal laser beam scan position. Beam position sensor 76 or 82 may be, e.g., a position sensitive detector (PSD) or a thermistor. There is a circuit 98 for comparing start of scan indications for the two printhead lasers. A circuit 100 for comparing the determined longitudinal beam positions, and a circuit 102, 104 responsive to the first and second circuits for modifying drum drive control 106 to change the rotational velocity of the corresponding drum. Circuit 100 may also respond to factory calibration information as indicated at 96. As noted earlier, the moving medium 36 sequentially receives image information from the drums 28 and 30, and the modification of the drum 30 drive and corresponding change of the rotational velocity of that drum modifies the relative positions in the direction of medium movement at which the respective drum image information is deposited on the moving medium. While not legible, two illustrative lines of text are shown on the drums of FIGS. 5 and 6. With drum 30 driven slightly more rapidly that drum 28, the text lines on drum 30 appear elongated in the process direction and spaced further apart as compared to those on drum 28. FIG. 7 functionally summarizes the operation of the system of FIGS. 4–6.

The printer of FIG. 1 has separate brushless direct current motors for each of the cartridge photoconductive (PC) drums 28, 30, 32 and 34. Sub-pel registration may be achieved by changing the velocity of the cartridge motors such as 92 or 94. It is known to have a small, e.g., 1% scrub between the PC drum and the ITM to aid in image transfer. Since both the ITM 36 and scanner are operating at the process speed, the image is compressed 1% from the scanner to the drum and then gets expanded that same 1% from the drum to the ITM. The net result yields the correct resolution for the image on the page. The velocity of the PC drum determines the time is takes for the image to travel from the imaging point to the first transfer. This time is equal to the distance from the image point to first transfer divided by the drum velocity. If the PC drum velocity is changed, then the time it takes the image to reach first transfer will also change. Therefore an increase in the drum velocity will decrease the travel time, that is, the image will arrive earlier at first transfer. The inverse is also true. A decrease in the drum velocity will increase the translation time therefore causing the image to arrive later. Using this concept, sub-pel registration in the process direction can be achieved. The following example demonstrates this concept with the scan period divided into, for example, eight subintervals. The eight right most columns of FIG. 12 indicate various operating values for cPhase corrections of 0 to 7 eighths of a scan period with drum velocity increasing and image transfer time decreasing resulting in the image being advanced in the process direction by the indicated eights of a scan period. The column headed "0" corresponds to no correction and if there were a ninth column headed "8", it would correspond to the previous scan line. Similarly, the other seven columns correspond to fractional delays of the image. Proper fractional portions of the scan period other than eights could be used.

Assumptions: Yellow CE Top Fine Adjust=0
   Yellow CE Top=0=cPhase
   First page is for Factory Calibration
   Cartridge speed=108.97 mm/sec
   Cartridge Count=9382
   Distance from Image to First Transfer=44.32 mm
   Distance from Y-Transfer to K-Transfer=303 mm
   Scan Time=0.0003846 sec
   Time per Zone=0.0000481 sec
   Drum dia.=30 mm When the first page is printed, the engine starts the EP run-in at 108.97 mm/sec and the RIP starts the printheads and then measures the phase once the mirror motors have reached operating speed. Assume that on the first page the Yellow SOS is in zone 2 (mPhase) as referenced to the K SOS. The RIP will calculate the cPhase (102, FIGS. 4 and 7) using the following equation:

$cPhase = nPhase - mPhase$

Figure 12:
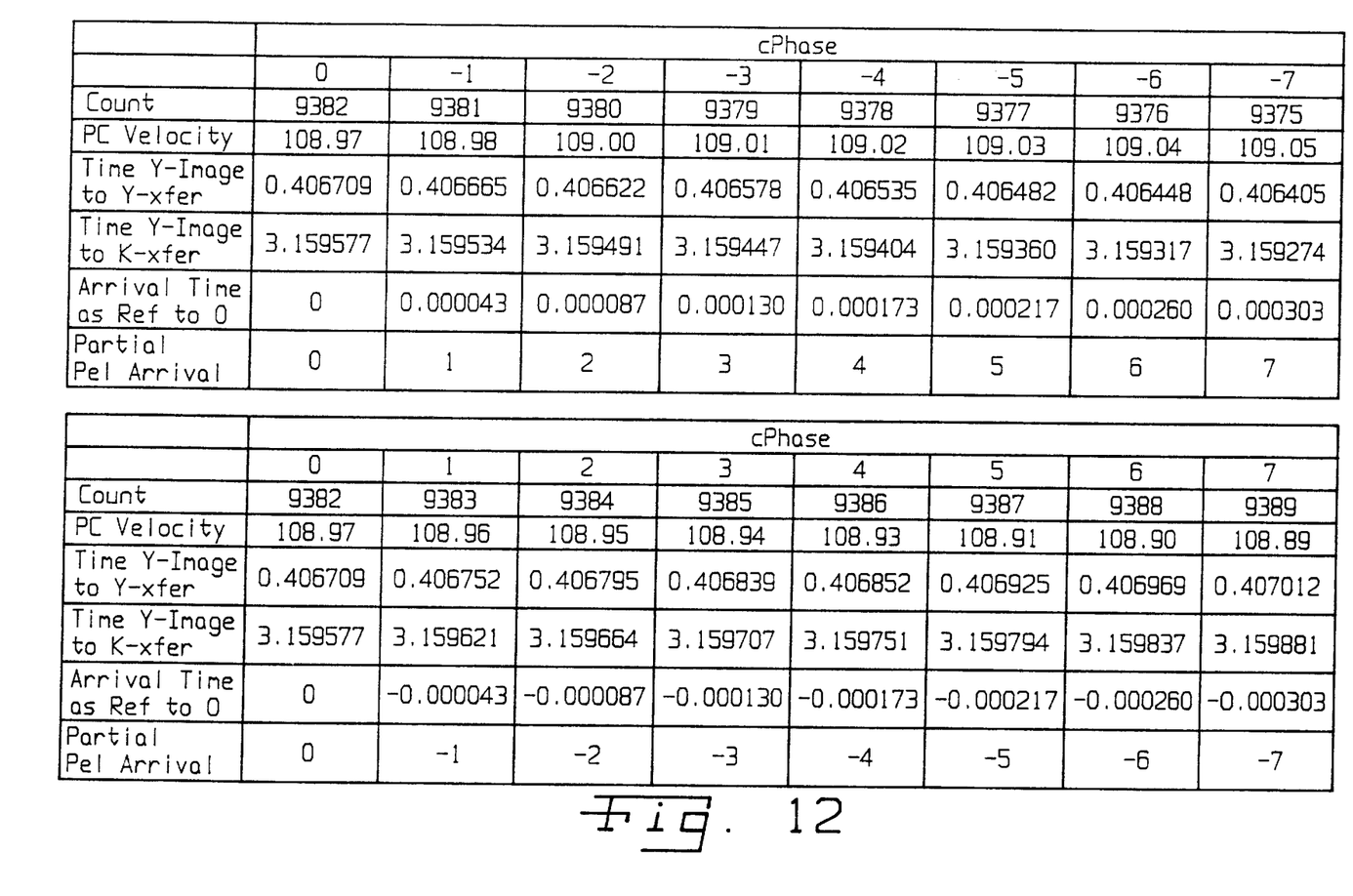
FIG. 12 is a table showing the relationship between variables such as image transfer times for the illustrative printheads of FIG. 11 with a scan period subdivided into eight illustrative time increments.

$-2 = 0 - 2$ and then send cPhase to the engine. The engine will then adjust the motor count by −2. Prior to adjusting the cartridge the time from the Y image to K transfer is 3.159577 seconds as shown in the table of FIG. 12. Once the engine adjusts the cartridge motor count by −2, the time from Y image to K Transfer is 3.159491.

In Summary the RIP will start the printheads and measure the phase difference between the K SOS and each of the color's SOS. The scan line is divided into 8 segments 0 to 7. The measured phase is referred to as mPhase(color). The RIP then calculates the correction factor by subtracting the mPhase from the stored phase value called nPhase(color).

$$cphase(color) = nPhase(color) - mPhase(color)$$

The RIP sends the cPhase values to the engine to be applied to the cartridge motor counts.

After completing the run-in process and before printing the first page, the engine receives the cPhase values from the RIP and applies them to the cartridge motor counts as in FIG. 12. At ½ speed the cPhase value should be doubled before adding it to the cartridge count.

The cartridge phasing process can also be used for the drift correct but it requires the engine to increase the interpage gap (IPG) so that the cartridge speed is not changed until the current image is off the PC drum. For a nominal IPG of 50.8 mm and the distance from image to transfer is 44.32 mm this change should be minimal. The techniques of the present invention may also be employed in image forming devices where one rotating mirror is shared by several lasers.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A process of coordinating the operation of a plurality of laser printheads which cooperate in the creation of an image by periodic laser beam transverse scans to form images at respective first locations, translate the formed images to respective second locations, and transfer the translated images to a common image receiving medium, comprising:

starting the scanning of first and second printheads in a random phase relationship to one another;

locking the scanning phase relationship between the first and second printheads;

determining the locked scanning phase relationship; and altering the translation time of the image formed by the second printhead by an amount determined, in part, by the determined phase relationship to achieve a predetermined apparent scanning phase relationship between the first and second printheads.

2. The process of claim 1, including the additional steps of:

starting the scanning of a third printhead in a random phase relationship to both the first and second printheads;

locking the scanning phase relationship between the first and third printheads;

determining the locked scanning phase relationship between the first and third printheads; and altering the translation time of the image formed by the third printhead by an amount determined, in part, by the determined phase relationship between the first and third printheads to achieve a predetermined apparent scanning phase relationship between the first and third printheads.

3. The process of claim 2, including the additional steps of:

starting the scanning of a fourth printhead in a random phase relationship to all of the first, second and third printheads;

locking the scanning phase relationship between the first and fourth printheads;

determining the locked scanning phase relationship between the first and fourth printheads; and altering the translation time of the image formed by the fourth printhead by an amount determined, in part, by the determined phase relationship between the first and fourth printheads to achieve a predetermined apparent scanning phase relationship between the first and fourth printheads.

4. The process of claim 1, wherein the phase relationship between the first and second printheads comprises the relative angular positions of a pair of rotatable multifaceted polygonal mirrors.

5. The process of claim 4, wherein the phase relationship between the first and second printheads is measured in units which are proper fractional parts of a scan period.

6. The process of claim 5, wherein the proper fractional parts are eights of a scan period.

7. The process of claim 1, further including the step of determining the longitudinal position of the transverse scan of each laser beam, the amount by which the translation time of the image formed by the second printhead is altered being also determined, in part, by the difference between the two determined longitudinal positions.

8. The process of claim 1, wherein the images are formed electrostatically on respective photoconductive drums, toner is selectively deposited on the drums and translated by drum rotation to respective transfer locations where adhering toner is transferred from a drum to an image receiving medium, the step of altering comprising changing the angular velocity of the second printhead drum.

9. A process of coordinating the operation of a plurality of laser printheads which cooperate in the creation of an image by periodic laser beam transverse scans to form images at respective first locations, translate the formed images to respective second locations, and transfer the translated images to a common image receiving medium, comprising:

determining the longitudinal position of the transverse scan of each laser beam; and altering the translation time of the image formed by at least one printhead by an amount determined, in part, by a corresponding determined longitudinal position to achieve sub-pel registration.

10. The process of claim 9, including the additional step of altering the translation time of the image formed by additional ones of the printheads by amounts determined, in part, by the determined longitudinal position of the transverse scan of corresponding laser beams.

11. The process of claim 9, wherein the images are formed electrostatically on respective photoconductive drums, toner is selectively deposited on the drums and translated by drum rotation to respective transfer locations where adhering toner is transferred from a drum to an image receiving medium, the step of altering comprising changing the angular velocity of the second printhead drum.

12. The process of claim 9, including the additional steps of:
   determining the scanning phase relationship between first and second ones of the printheads; and
   altering the translation time of the image formed by the second printhead by an amount determined, in part, by the determined phase relationship to achieve a predetermined apparent scanning phase relationship between the first and second printheads.

13. The process of claim 12, wherein the phase relationship between the first and second printheads comprises the relative angular positions of a pair of rotatable multifaceted polygonal mirrors.

14. The process of claim 12, wherein the phase relationship between the first and second printheads is measured in units which are proper fractional parts of a scan period.

15. The process of claim 14, wherein the proper fractional parts are eights of a scan period.

16. An image forming apparatus comprising:
   at least two laser printheads each having a cylindrical photoconductive drum, a drum drive for rotating the drum about a corresponding cylinder axis, a laser for providing an image information modulated laser beam, a rotatable mirror for repeatedly directing the laser beam to scan the photoconductive drum in a transverse direction, a start of scan sensor for determining when the laser beam commences a drum scan, and a beam position sensor for determining longitudinal laser beam scan position;
   a first circuit for comparing start of scan indications for the two printhead lasers;
   a second circuit for comparing the determined longitudinal beam positions; and
   a third circuit responsive to the first and second circuits for modifying at least one drum drive to change the rotational velocity of the corresponding drum.

17. The image forming apparatus of claim 16, further including a moving medium for sequentially receiving image information from the drums, the modification of the at least one drum drive and corresponding change of the rotational velocity of the corresponding drum modifying the relative positions in the direction of medium movement at which the respective drum image information is deposited on the moving medium.

18. The image forming apparatus of claim 16, wherein said beam position sensor comprises one of a position sensitive detector and a thermistor.

19. The image forming apparatus of claim 18, wherein said beam position sensor comprises a thermistor, and said laser beam scan position is derived from an output signal from said thermistor.

20. An image forming apparatus comprising:
   at least two laser printheads each having a cylindrical photoconductive drum, a drum drive for rotating the drum about a corresponding cylinder axis, a laser for providing an image information modulated laser beam, a start of scan sensor for determining when the laser beam commences a drum scan, and a beam position sensor for determining longitudinal laser beam scan position;
   at least one rotatable mirror, each said mirror being associated with at least one said laser for repeatedly directing a corresponding said laser beam to scan a corresponding said photoconductive drum in a transverse direction,
   a first circuit for comparing start of scan indications for the two printhead lasers;
   a second circuit for comparing the determined longitudinal beam positions; and
   a third circuit responsive to the first and second circuits for modifying at least one drum drive to change the rotational velocity of the corresponding drum.

21. The image forming apparatus of claim 20, wherein said at least one rotatable mirror comprises at least two rotatable mirrors, each said rotatable mirror associated with a corresponding said laser.

22. The image forming apparatus of claim 21, wherein each said printhead includes a corresponding said rotatable mirror.

23. The image forming apparatus of claim 20, wherein said beam position sensor comprises one of a position sensitive detector and a thermistor.

24. The image forming apparatus of claim 23, wherein said beam position sensor comprises a thermistor, and said laser beam scan position is derived from an output signal from said thermistor.

* * * * *